United States Patent [19]

Mitchell et al.

[11] Patent Number: 5,549,266

[45] Date of Patent: Aug. 27, 1996

[54] MOUNTING BRACKET WITH WATER DEFLECTOR

[75] Inventors: Alton D. Mitchell, Princeton; Keith D. Ruby; Ronald W. Miles, both of Hopkinsville, all of Ky.; Robert L. Naas, Skaneateles, N.Y.

[73] Assignee: KenTech Plastics, Inc., Hopkinsville, Ky.

[21] Appl. No.: 231,150

[22] Filed: Apr. 22, 1994

[51] Int. Cl.⁶ .................................................. A47B 96/00
[52] U.S. Cl. ....................... 248/205.1; 248/906; 362/147; 362/382
[58] Field of Search ................................. 248/27.1, 200, 248/309.1, 683, 906, 205.1; 362/368, 382, 147; 52/28, 211

[56] References Cited

U.S. PATENT DOCUMENTS

| | | |
|---|---|---|
| 2,114,158 | 4/1938 | Vasbinder . |
| 3,494,244 | 2/1970 | Wayland . |
| 4,222,093 | 9/1980 | Garcia et al. .................. 362/368 X |
| 4,381,633 | 5/1983 | MacLeod . |
| 4,391,068 | 7/1983 | Kosar . |
| 4,635,168 | 1/1987 | Crowley ................................ 362/147 |
| 4,646,488 | 3/1987 | Burns . |
| 4,726,152 | 2/1988 | Vagedes et al. . |
| 4,733,330 | 3/1988 | Tanaka et al. ................ 248/906 X |
| 4,827,386 | 5/1989 | Mackiewicz ................ 362/147 X |
| 4,854,093 | 8/1989 | Kellom ............................... 52/28 |
| 4,887,195 | 12/1989 | Donelan ............................ 362/147 |
| 4,920,708 | 5/1990 | MacLeod et al. ................ 52/28 x |
| 5,000,409 | 3/1991 | MacLeod et al. .............. 362/147 X |
| 5,275,366 | 1/1994 | Simmons ........................ 362/432 X |
| 5,326,060 | 7/1994 | Chubb et al. .................. 248/906 X |

Primary Examiner—Karen J. Chotkowski
Attorney, Agent, or Firm—Gilliam & Stockwell

[57] ABSTRACT

A mounting bracket includes a cover plate, a back plate and a deflecting strip depending from the back plate. The deflecting strip directs water cascading down along the back plate away from the wall of the building structure. The bracket further includes a connecting projection formed on the cover plate and a receiving socket formed on the back plate. When mated with each other, the projection and socket allow the cover plate to be positioned in any one of an infinite number of positions, within the connection range, relative to the back plate. The connecting projection and receiving socket are each formed in a position on its supporting component that is laterally offset from a center line bisecting the component. This design placement allows the connecting projection and the receiving socket to be matingly aligned when the cover plate and back plate are brought together for assembly in a working mode. The design placement further allows them to be laterally offset from one another when the cover plate and back plate are brought together for nesting relationship in a transport mode. The back plate is provided with sets of alternative attachment spots that are protected from exposure and permit alternative types of attachment elements to secure the bracket to the wall of the building structure.

40 Claims, 4 Drawing Sheets

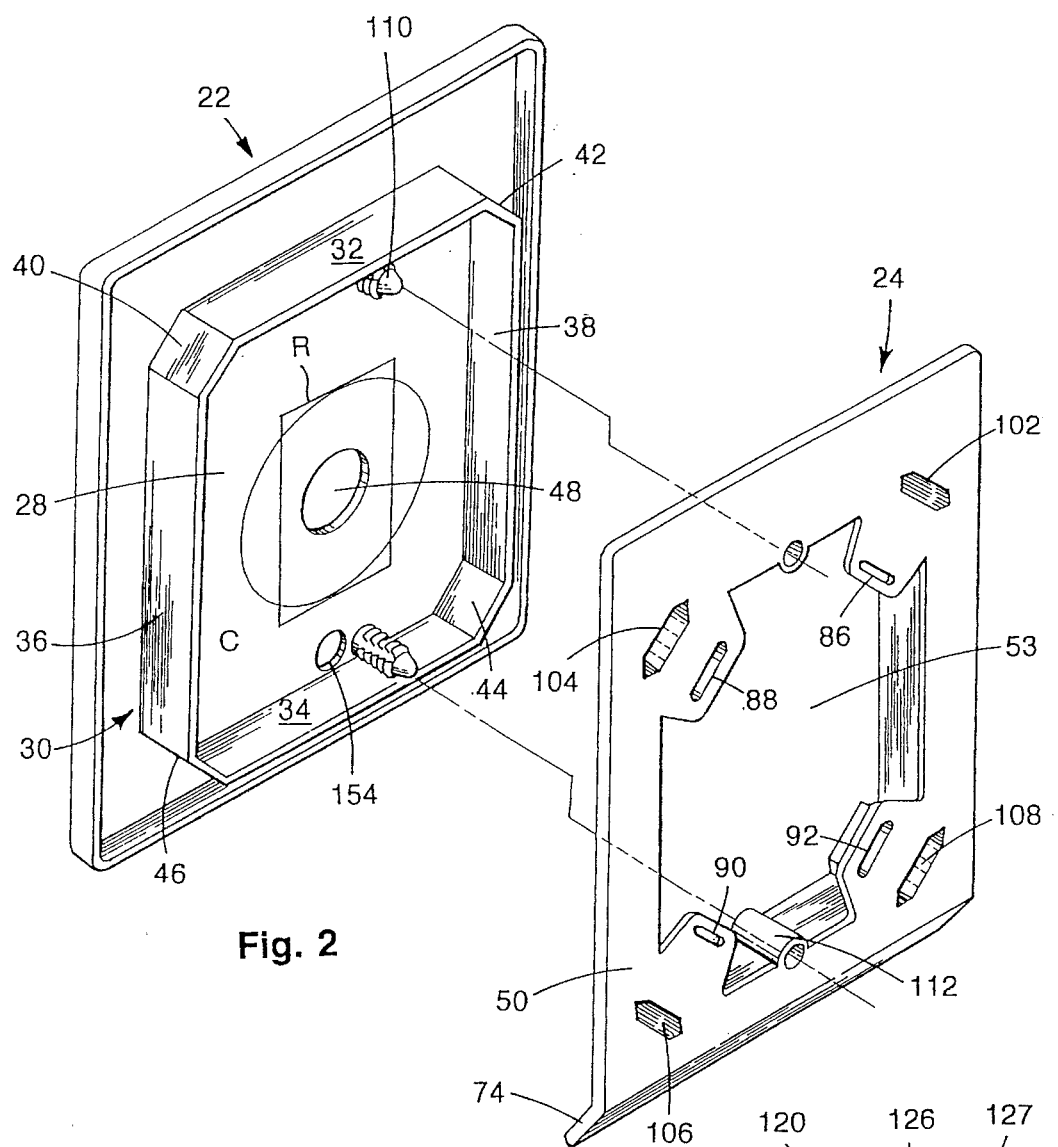
Fig. 2
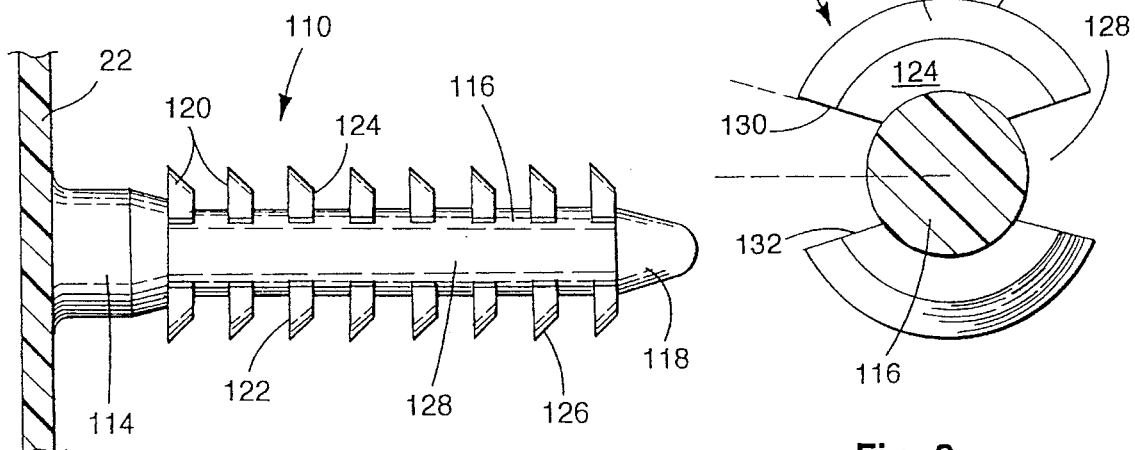
Fig. 7
Fig. 8

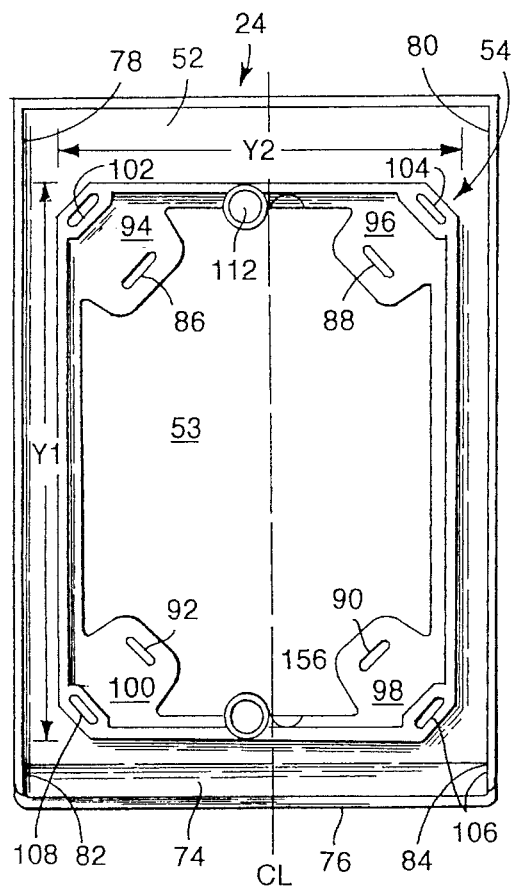
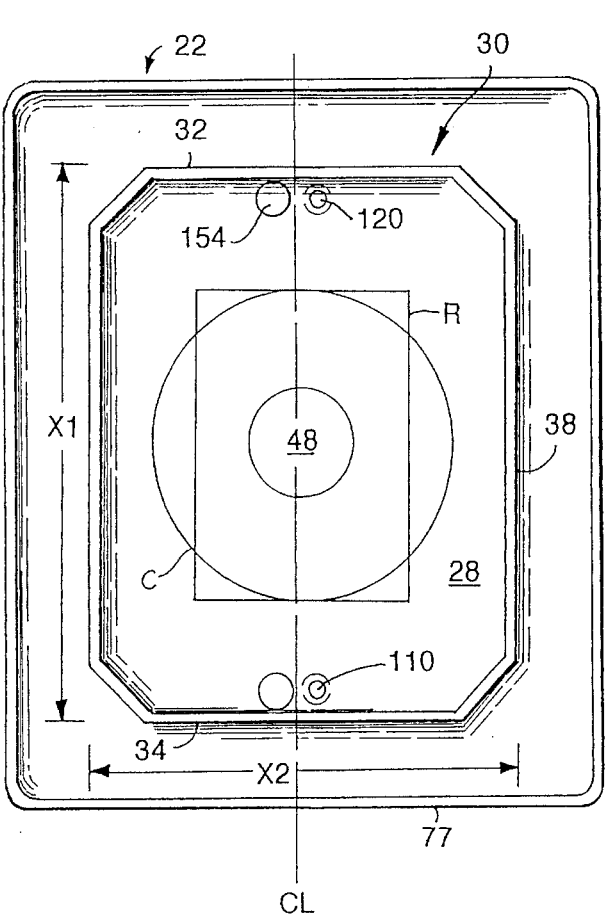
Fig. 5       Fig. 6
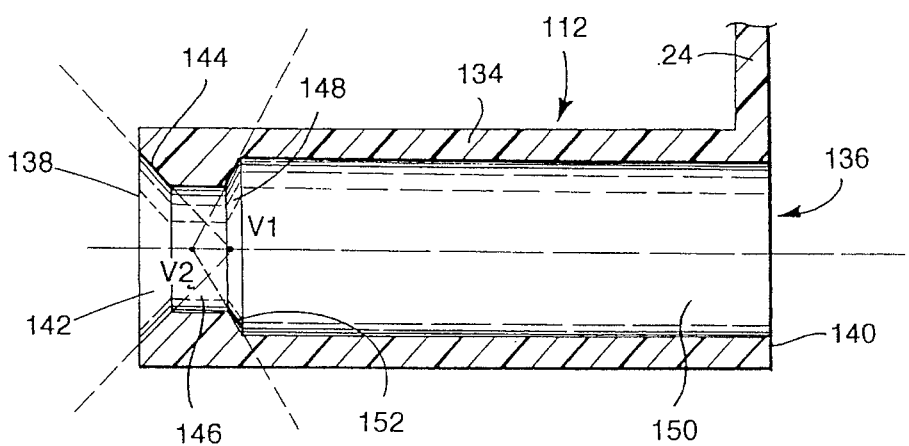
Fig. 9

MOUNTING BRACKET WITH WATER DEFLECTOR

TECHNICAL FIELD

The present invention relates to the field of mounting brackets and, more particularly, to an improved bracket, for mounting a fixture to a wall of a building structure having a stepped siding overlay, that is infinitely positionable, within its connection range, relative to the wall, and that incorporates a means for deflecting fluids, i.e. rainwater, away from the surface of the wall.

BACKGROUND OF THE INVENTION

Many new homes and other building structures are being constructed with aluminum or vinyl siding as an outer overlay. Most of these structures are provided with one or more outdoor fixtures to serve both functional and decorative purposes. More specifically, outside lights at various positions around the periphery of the structure are used for both safety and convenience to illuminate the surrounding area at night. Doorbells are often tastefully presented by an attractive mounting on the wall of a house next to the door thereof. Many homeowners choose to have the house number and/or name of the occupant attractively displayed on the side of the house.

In addition, exhaust vents for certain appliances that emerge from within the building structure are often attractively presented with a mounting cover, as are outside electrical outlets. Fixtures of these types are generally attached to the building structure by means of a mounting bracket.

Prior art brackets have generally been composed of a cover plate on which the fixture is presented and a back plate that is attached to the wall sheathing of the structural framework. In order to connect the fixture to the electrical circuit inside the building or direct the vent tube to the outside of the building, a section of siding must be cut out to provide an area for the wiring or vent tube to extend through the wall sheathing to the mount position.

It can be appreciated that the gap in the siding provides a site for the introduction of fluids to the wall sheathing and subsequently to the inside of the building. More specifically, the gap cut in the siding interrupts its protective integrity. Furthermore, the structural positioning of the cover plate relative to the back plate creates a channel closely adjacent to the siding for downwardly cascading fluid such as rainwater. These conditions operate together to threaten damage to the structural framework of the building.

This significant concern has not previously been addressed within the construction industry. To the inventors' knowledge, no one has thought to create a means to direct downwardly cascading water away from the building wall in the area of the cut in the siding.

Previous attempts have been made to design a mounting bracket with a cover plate that may be positionally adjusted with respect to the building wall by providing predetermined locking positions for the cover plate relative to the back plate. While this form of bracket may be used with a variety of types of siding, it does not ensure flush engagement between the cover plate and siding. Thus, this bracket design does not minimize the width of the channel created between the cover plate and back plate through which water may flow.

SUMMARY OF THE INVENTION

It is therefore a primary object of the present invention to provide a bracket for mounting a fixture on a building structure with a stepped siding overlay having the ability to protect against the introduction of water to the wall sheathing in the area of the siding cut away for placement of the bracket.

It is another object of the present invention to provide a bracket for mounting a fixture on a building structure with a stepped siding overlay having the capability of deflecting water away from the structural framework of the building in the area of a gap cut in the overlying siding.

It is an additional and related object of the present invention to provide a mounting bracket that is infinitely positionable, within its connection range, with respect to its supporting building structure in order to accommodate siding having outwardly extending steps of any dimension.

It is a further object of the present invention to provide a mounting bracket having alternative attachment apertures to allow greater versatility for the installing contractor in attaching the bracket to a building structure.

Still another object of the present invention is to provide a bracket having attachment apertures that are positioned away from the edges of the bracket.

A still further object of the present invention is to provide a mounting bracket with a cover plate that telescopes over a back plate to rest at any of an infinite number of positions within its telescoping range and that is designed to protect the elements that attach the bracket to a building structure within the envelope of the telescoping structure.

Yet another object of the present invention is to provide a mounting bracket with a cover plate and back plate that are designed for an aligned mating relationship in a working mode and for a nesting relationship in a transport mode.

Additional objects, advantages and other novel features of the invention will be set forth in part in the description that follows and in part will become apparent to those skilled in the art upon examination of the following or may be learned with the practice of the invention. The objects and advantages of the invention may be realized and obtained by means of the instrumentalities and combinations particularly pointed out in the appended claims.

To achieve the foregoing and other objects, and in accordance with the purposes of the present invention as described herein, an improved mounting bracket designed for use with stepped siding overlying a building structure is provided. The bracket comprises a cover plate for supporting the fixture and a back plate that is attached to the building structure. Advantageously, a strip is associated with the back plate and depends therefrom to deflect fluid such as rainwater away from the building structure. As a result, the introduction of water is substantially prevented.

In order to optimize the protective capability of the invention, the strip depending from the back plate is preferably formed integrally therewith. In order to fulfill the objective, the strip extends at an oblique angle away from the wall-engaging surface of the back plate.

In the preferred embodiment, the strip depends at an angle of substantially 45° from the building structure. However, it can be appreciated that other oblique angular configurations may be utilized as desired. The key, of course, is to ensure that there is sufficient inclination to direct the water flowing down the edges of the back plate in a direction away from the interior of the wall to drain to the exterior.

To further enhance the deflective ability of the inventive bracket, both the back plate and the integral strip are desirably provided with flanges on each of the side edges thereof to contain fluid flowing therealong within the lateral boundaries of the back plate and the strip. The flanges of the back plate and deflecting strip are preferably in substantial linear alignment to facilitate the fluid containing function. The flanges provide valuable added assistance in directing the cascading fluid to the deflector and away from the unprotected wall sheathing of the building structure.

In the preferred embodiment of the invention, the cover plate and back plate are formed as separate and discrete components. This allows versatility in positioning the mounting bracket in its working mode as is more fully described below.

Those familiar with building construction realize that the horizontal dimension of the steps differ in accordance with various types of siding. Thus, it is impractical to design a mounting bracket with a cover plate and back plate having a fixed relative spacing. While some prior art brackets address this design issue, the solutions presented have been less than complete. More specifically, while prior art designs offer the ability to adjust the relative position between the cover plate and back plate, each of the alternative positions have represented a predetermined fixed spacing.

A key aspect of the present invention is the ability to provide infinite positioning of the cover plate relative to the back plate within its connection range. Toward this objective, the mounting bracket of the present invention includes axial interengaging means. The preferred embodiment of the axial interengaging means comprises a connecting projection that cooperates with a receiving socket.

In the preferred embodiment, the connecting projection is formed integrally with either of the cover plate or the back plate and the receiving socket is formed integrally with the other of the components. Thus, when the cover plate and the back plate are presented to each other for connection, the projection and socket interengage in joining relationship.

The connecting projection desirably includes a plurality of sets of spaced resilient teeth disposed on a longitudinal shank. The spaced nature of the sets of teeth create channels along opposing sides of the longitudinal shank. Preferably, opposing side surfaces of the sets of teeth that define the channels extend radially from the shank at an oblique angle relative to a plane bisecting the channels. In the particular preferred design of the projection, the oblique angle is substantially 10°.

The receiving socket includes a proximal end, a distal end and a plurality of discrete bores. A guiding orifice is constructed at the proximal end of the receiving socket. The guiding orifice advantageously has a frusto-conical configuration to assist in directing the teeth of the connecting projection into the receiving socket. In the particular preferred embodiment, the guiding orifice is defined by a surface extending from an imaginary vertex at an angle of substantially 45° relative to the central axis of the receiving socket.

The receiving socket further includes an arresting bore in communication with the guiding orifice. The arresting bore is preferably of cylindrical configuration. In order to perform its arresting function, the diameter of the arresting bore is of smaller dimension than the outer diameter of the connecting projection. The outer diameter of the connecting projection is defined by the peripheral edges of the resilient teeth.

The distal end of the receiving socket is preferably defined by a retaining bore that communicates with the arresting bore. The retaining bore has a cylindrical configuration, with a diameter of dimension greater than the diameter of the arresting bore. The diameter of the retaining bore is of sufficient dimension to allow the resilient teeth to be confined therein substantially in their normal configuration.

Preferably, the receiving socket also includes a locking shoulder that transitions between the arresting bore and the retaining bore. The locking shoulder is also of frusto-conical configuration. The locking shoulder has a short linear dimension, thus providing a quick transition between the arresting bore and the retaining bore. Toward this end, the locking shoulder is defined by a surface that extends from an imaginary vertex at an angle of substantially 60° relative to the central axis of the receiving socket.

While one connecting projection/receiving socket combination is sufficient to interconnect the cover plate and the back plate, it can be appreciated that any number of sets of these elements may be provided. In the preferred embodiment, two spaced projection/socket combinations are provided to facilitate even joining of the cover plate and back plate.

When securing the cover plate and back plate together in relative connection, the resilient teeth of the connecting projection are guided by the guiding orifice into the arresting bore of the receiving socket. The teeth are compressed against the surface of the arresting bore and, due to their resiliency, are deformed as the projection travels forwardly. Once a set of teeth are within the arresting bore, they resist any attempt at backward travel and thus restrain the connecting projection from withdrawal. When a set of teeth transitions into the retaining bore, those teeth regain their original configuration. The locking shoulder acts to assure against any retracting motion.

In the preferred embodiment of the mounting bracket, the back plate has at least two attachment apertures, the through dimension of one aperture being greater than the through dimension of the other aperture. The particular preferred design of the back plate incorporates a plurality of sets of apertures of different dimensions. There is a set of apertures desirably placed in each of four corners for symmetrical force distribution. The use of apertures of different dimensions gives the contractor the ability to choose between alternative attachment elements (i.e. staples or nails) as desired.

In order for the separate components to mate together in the working environment and protect the wiring of the mounted fixture, the cover plate has a sleeve extension that telescopes with a neck extension on the back plate. The telescoping extensions define an enclosed cavity between the cover plate and back plate for receiving fixture constituents.

The preferred structure of the back plate has at least one attachment aperture in substantially coplanar position with respect to the enclosing frame defined by the telescoping sleeve and neck extensions. Furthermore, there is also preferably at least one attachment aperture interior of the enclosing frame. Ideally, each of the attachment apertures, however many are provided, are either substantially coplanar with, or interior of, the enclosing frame.

The inventive mounting bracket provides a further unique feature that is not contemplated in the prior art. Since the preferred embodiment contemplates the cover plate and back plate as being separate components, these individual components of the mounting bracket are shipped as separate items. In order to optimize space utilization and minimize shipping costs, the inventive mounting bracket is designed to place the connecting projection and receiving socket in such a manner to allow a nesting relationship between the cover plate and back plate when not connected for operative use. More specifically, the cover plate and back plate are configured so as to present themselves to each other in connecting relationship in a working mode and to present themselves to each other in a nesting relationship in a transport mode.

In the preferred embodiment, the connecting projection is formed on the cover plate and the receiving socket is formed on the back plate. The projection and socket are positioned so as to be in alignment for mating in the working mode and so as to be unaligned for nesting in the transport mode. In constructing the components to achieve this result, the connecting projection and receiving socket are laterally offset from a center line that bisects the component on which they are formed. Accordingly, one of the components can be rotated about a central axis to allow the connecting projection and the receiving socket to nest adjacent to one another in a transport mode.

To further facilitate the nesting arrangement, the inner surfaces of the back plate and cover plate are provided with recesses for receiving the connecting member of the other component when in the transport mode. The use of recess as also reduces material costs without substantially affecting tooling to form the components.

Still other objects of the present invention will become apparent to those skilled in this art from the following description wherein there is shown and described a preferred embodiment of this invention, simply by way of illustration of one of the modes best suited to carry out the invention. As will be realized, the invention is capable of other different embodiments and its several details are capable of modification in various, obvious aspects all without departing from the invention. Accordingly, the drawings and descriptions will be regarded as illustrative in nature and not as restrictive.

BRIEF DESCRIPTION OF THE DRAWING

The accompanying drawing, incorporated in and forming a part of the specification, illustrates several aspects of the present invention and together with the description serves to explain the principles of the invention. In the drawing:

FIG. 2 is an exploded view of the mounting bracket, showing the cover plate and the back plate as separate components;

FIG. 5 is a view of the surface of the back plate that is presented to the cover plate;

FIG. 6 is a view of the surface of the cover plate that is presented to the back plate;

FIG. 7 is an enlarged view of the connecting projection use to facilitate connection between the back plate and the cover plate of the mounting bracket;

FIG. 8 is a cross-sectional view taken across the lines 8—8 of FIG. 7;

FIG. 9 is an enlarged view of a receiving socket used to facilitate connection between the cover plate and the back plate of the mounting bracket;

Figure 1:
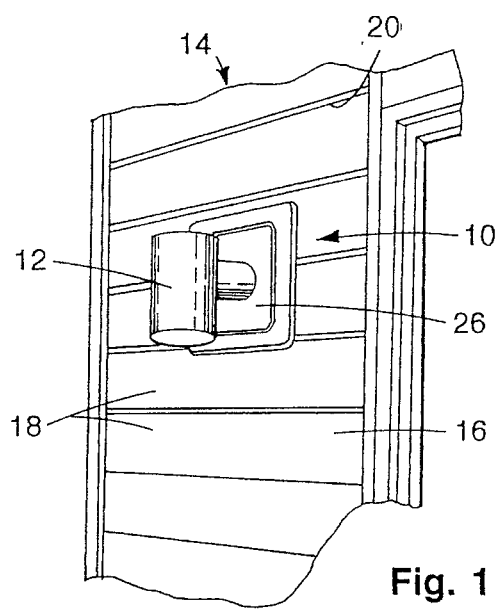
FIG. 1 is a perspective view of the mounting bracket of the present invention in its assembled and operative configuration mounting a fixture on stepped siding overlaying a building.

Reference will now be made in detail to the present preferred embodiment of the invention, an example of which is illustrated in the accompanying drawing.

DETAILED DESCRIPTION OF THE INVENTION

A novel mounting bracket 10 including several improvement aspects over the prior art is disclosed. As will be described in detail below, the bracket 10 provides a variety of advantages over mounting brackets in present use.

The inventive bracket 10 is used to mount a fixture 12 (shown in FIG. 1 as a porch light) on the wall 14 of a building structure. As will be realized after the forthcoming discussion, the bracket 10 is particularly suitable for mounting such fixtures 12 to a wall 14 covered with aluminum or vinyl siding 16 formed in conventional stepped manner with planks 18 and steps 20.

Figure 4:
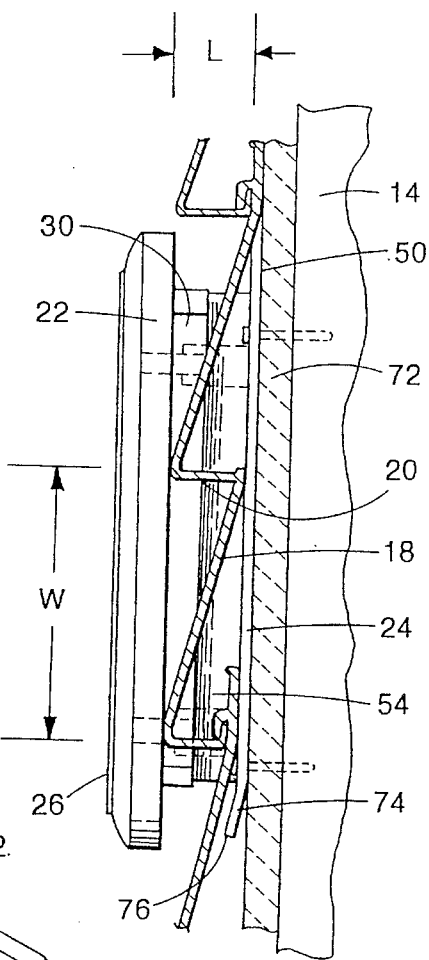
FIG. 4 is a side view of the mounting bracket of the present invention in its assembled and operative configuration in a working mode.

The preferred embodiment of the inventive bracket 10 comprises a cover plate 22 and a back plate 24. The cover plate 22 and back plate 24 are desirably formed as separate components and are assembled together to form a single unit in its working environment as shown in FIGS. 1 and 4. In order to facilitate ease of manufacture, handling and use, the inventive bracket 10 is preferably constructed of molded plastic. However, it can be appreciated that other materials that allow the bracket to suitably perform its varied functions may be employed without departing from the concepts of the invention.

With reference first to the cover plate 22, it has a decorative front surface 26 from which the fixture 12 extends. A back surface 28 faces the back plate 24 when the cover plate 22 and back plate present themselves together in either a working mode or a transport mode. A sleeve extension 30 is integrally formed on the back surface 28 of the cover plate 22 to assist in joining the cover plate 22 back plate 24 assembly as will be further described below. As is shown in FIG. 2, the sleeve extension 30 is preferably of generally rectangular configuration defined by a top wall 32 and a bottom wall 34 in substantial perpendicular relation to side walls 36, 38. Each of the adjacent walls 32–38 are connected by slanted sections 40, 42, 44, 46, respectively.

The cover plate 22 is formed with a center hole 48. It can be appreciated by those skilled in the art that wiring or other attaching constituents for the fixture 12 generally extend through the center hole 48 to connect to the appropriate accessories inside the building structure.

A fixture 12 may require additional area on the cover plate 22 for proper mounting in various specific circumstances. For instance, a rectangular box that houses wiring for alternative circuits is sometimes desired for mounting on the building structure. In order to accommodate fixtures 12 requiring additional mounting space, the back surface 28 of the cover plate 22 is provided with score lines defining areas that a contractor may carve out and remove as needed. A rectangular-shaped score line R is presented to indicate the area of the cover plate 22 to dislodge for receipt of a fixture 12 having a rectangular mounting frame. Likewise, a circular score line C is presented to denote the area to remove for a fixture 12 having a circular mounting frame.

The back plate 24 is comprised of a first, wall-engaging surface 50 illustrated in FIG. 2. The back plate 24 also has a second surface 52 best shown in FIG. 3. The first surface 50 generally defines a peripheral margin surrounding an opening 53 formed in the back plate 24. The second surface 52 faces the cover plate 22 when the back plate 24 and the cover plate are presented from nesting and assembly.

Similarly to the cover plate 22, the back plate 24 includes a neck extension 54 formed integrally to and extending from the second surface 52 of the back plate 24. Like the sleeve extension 30 on the cover plate 22, the neck extension 54 has a generally rectangular configuration defined by a top flat 56, a bottom flat 58, and side flats 60, 62 oriented substantially perpendicularly to the top and bottom flats. The neck extension 54 also has sloped sections 64, 66, 68, 70 that connect adjacent flats 56–62.

In order to facilitate the assembly of the cover plate 22 and back plate 24 in both a working mode and a transport mode, the sleeve extension 30 and the neck extension 54 are designed so as to allow telescoping engagement. In the preferred embodiment, the neck extension 54 is of slightly smaller dimension than the sleeve extension 30 so as to allow the neck extension 54 to telescope within the sleeve extension 30 (see FIG. 4). Thus, in the preferred design as noted in FIG. 5 and 6, the distances $X_1$ between top wall 32 and bottom wall 34 and $X_2$ between side wall 36 and side wall 38 for the sleeve extension are slightly greater than the corresponding distances $Y_1$ between the top flat 56 and bottom flat 58 and $Y_2$ between side flat 60 and side flat 62 of the neck extension 54. The surface distances of the slanted sections 40–46 on the sleeve extension 30 and the corresponding sloped sections 64–70 are dimensioned accordingly to further facilitate telescoping engagement.

It can be visualized that upon presentation of the cover plate 22 and the back plate 24 to each other in a working mode, the telescoping engagement of the neck extension 54 within the sleeve extension 30 provides an enclosing frame around a cavity between the cover plate and back plate. This cavity houses the constituents leading from the interior of the building structure to the fixture 12 mounted on the exterior. The enclosing frame protects the constituents from the outside elements.

FIG. 4 also illustrates the manner in which the bracket 10 is attached to the building structure in its working mode. The wall 14 of the building structure is generally defined by a layer of sheathing 72 to which both the siding 16 and the back plate 24 of the bracket 10 are attached. Although not shown in the drawing figures, those skilled in the art recognize that a portion of the siding 16 must be cut out to expose the sheathing 72 for attachment of the back plate 24 to the wall 14. It can be appreciated that cutting a portion of the siding 16 away disrupts its protective integrity. One of the drawbacks of prior art brackets has been the inability to prevent fluids such as rainwater from invading the area where the siding has been cut away. Thus, the chance of damage to the sheathing 72 and other areas of the wall 14 is significant in view of the opportunity for water to be introduced thereto.

In order to address this drawback, the inventive bracket 10 includes, as one of its key aspects, a deflecting strip 74 depending from the bottom of the back plate 24 and extending across the entire bottom edge thereof. The deflecting strip 74 is formed at an oblique angle relative to the back plate 24, so as to extend away from the surface of the sheathing 72 to which the back plate is attached (see FIG. 4). Accordingly, rainwater cascading down the back plate 24 of the bracket 10 is directed away from the sheathing 72 in the area where the siding 16 has been removed.

Ideally, the deflecting strip 74 is formed integrally with the back plate 24. This provides complete integrity to ensure that no fluid is allowed to infiltrate the cut in the siding 16 within the envelope of the back plate 24.

It can be appreciated that the oblique angle at which the depending strip 74 extends away from the sheathing 72 can measure within a range that is sufficient to direct water away from the sheathing and yet keep from accumulating on a level or upturned surface. The preferred embodiment contemplates that the depending strip 74 be formed at an angle of substantially 45° for optimum operation.

In order to not detract from the visual presentation of the mounting bracket, the length of the deflecting strip 74 is such that its bottom edge 76 does not extend beyond the envelope defined by the bottom edge 77 of the cover plate 22. Accordingly, the deflecting strip 74 serves a valuable purpose while allowing the bracket 10 maintain a pleasing appearance.

To further enhance the protecting capability of the inventive bracket 10, the back plate 24 is formed with upraised flanges 78, 80 on opposing side edges thereof. The deflecting strip 74 has similar upraised flanges 82, 84 on opposing side edges thereof. The upraised flanges 78–84 serve to retain fluid within the envelope of the back plate 24 so as to ensure its downward flow towards and inside the boundaries of the deflecting strip 74. The upraised flanges 78–84 add further protection against the possibility of fluid invading the area cut from the siding 16 for placement of the bracket 10.

An additional key aspect of the present invention is the versatility which it provides to the contractor for attaching the bracket 10 to the wall 14 of the building structure. More specifically, the back plate 24 is designed with two different forms of attachment areas to allow the installer to choose how to attach the back plate to the sheathing 72.

Figure 3:
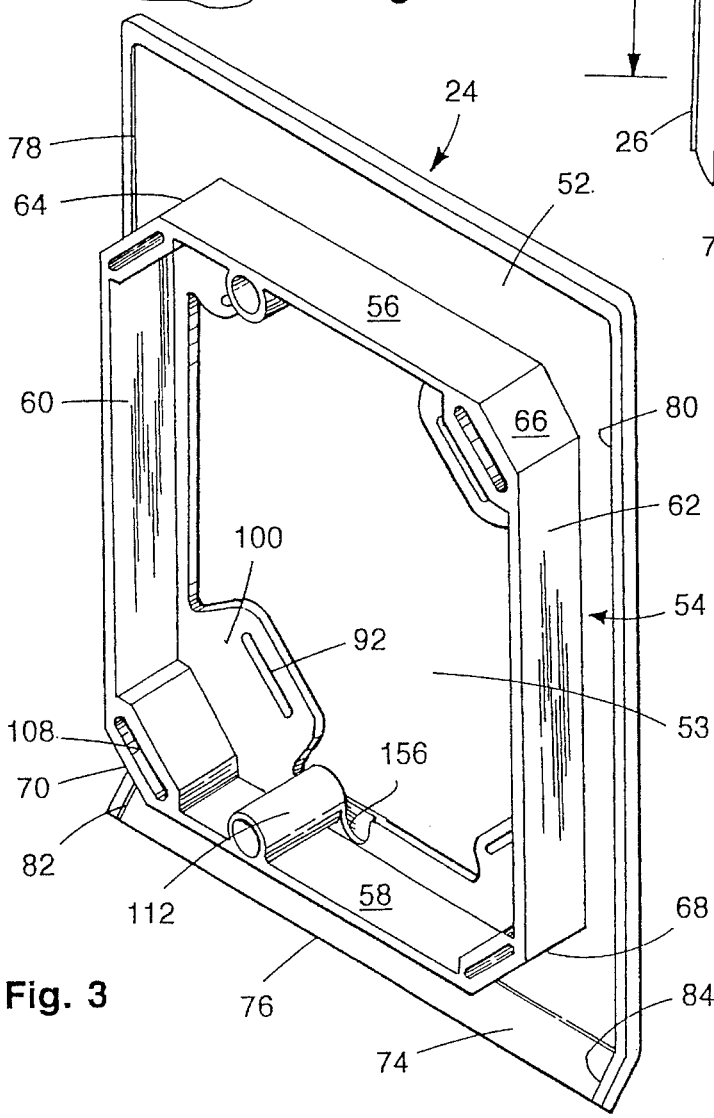
FIG. 3 is a perspective view of the back plate of the inventive mounting bracket.

As best shown in FIGS. 2, 3 and 5, the back plate 24 is preferably constructed with a plurality of sets of alternate attachment spots. In order to equally distribute the supporting forces for the back plate 24, a plurality of attachment apertures 86, 88, 90, 92 are formed in each of four radially inwardly extending protrusions 94, 96, 98, 100 on the back plate 24. The attachment apertures 86–92 are particularly suited for short attachment elements such as structural staples that are introduced with a staple gun. Of course, the attachment apertures 86–92 may also receive nails therethrough for securement.

The bracket 10 is also desirably provided with alternative attachment slots associated with the neck extension 54. Preferably, attachment slots 102, 104, 106, 108 are formed to extend through the neck extension 54. Thus, comparing FIGS. 2 and 3, it is seen that the attachment slots 102–108 have a greater through dimension than attachment apertures 86–92. With further reference to FIGS. 3 and 5, each of the attachment slots 102–108 are formed in corresponding sloped sections 64–70. The attachment slots 102–108 are suited for receiving long, heavy gauge attachment nails or screws. The corner positioning of the attachment apertures 86–92 and attachment slots 102–108 assist in allowing placement of attachment elements to provide distributed support around the back plate 24. By virtue of the corner positioning of both the attachment apertures 86–92 and attachment slots 102–108, there are four sets of pairs of alternative attachment spots, one pair of alternative attachment spots comprising an attachment aperture (i.e. 92) and an attachment slot (i.e. 108). It can be appreciated that for extra security, both alternative attachment spots in any of the corner locations may be utilized to secure the back plate 24 to the adjacent sheathing 72.

It is important to note an additional novel aspect of the placement of the attachment spots. The preferred design of the back plate 24 positions the attachment spots either substantially coplanar with, or interior of, the enclosing frame defined by the telescoping sleeve extension 30 and neck extension 54. More particularly, since the attachment slots 102–108 are coplanar with and extend through the neck extension 54, the sleeve extension 30, in telescoping thereover, covers any attachment elements inserted through the attachment slots.

Furthermore, the attachment apertures 86–92 are positioned interior of the telescoping sleeve extension 30/neck extension 54 assembly. Therefore, any attachment elements received through the apertures 86–92 are also protected from exposure to the elements. Accordingly, it can be recognized that, in contrast to prior art designs, the inventive mounting bracket 10 eliminates the opportunity for damage to the attachment elements due to outside influences, such as rusting from exposure to water, by protecting them from such exposure. The positioning of the attachment spots is thus a valuable feature for the inventive bracket 10 that provides previously unrecognized benefits.

There are a variety of types of siding 16 that are used to cover building structures. The width W (i.e. vertical dimension) of the siding plank 18 and length L of the step 20 vary widely with the various types of siding 16. It is desirable to have a mounting bracket 10 that can be adapted for use with any and all of the types of sidings 16 used in building construction. In order to fulfill this objective, prior art brackets have been designed to allow the cover plate associated therewith to be positioned at predetermined distances from the sheathing to which the bracket is attached.

While the versatility provided by predetermined incremental positioning between the cover plate and wall sheathing has provided benefits, it does not allow for ideal application. As shown in FIG. 4, it is preferable to have the cover plate 22 resting as close to the siding 16 as possible for both decorative reasons and to minimize the chance of water invading the cutout area in the siding. The present invention provides a means for infinitely positioning, within the connection range, the cover plate 22 with respect to the back plate 24, and thus the siding 16, to satisfy the goals of accommodating a variety of sidings and optimal relative positioning thereover.

This function is accomplished by an axial interengaging means that is defined in the preferred embodiment by a connecting projection 110 that mates with a receiving socket 112. The connecting projection 110 and receiving socket 112 are each formed on the surface of one of the cover plate 22 and back plate 24 that is presented to the other for connection in a working mode. Although it can be envisioned that the connecting projection 110 and receiving socket 112 could each be formed on either of the cover plate 22 or back plate 24, the preferred embodiment provides the optimal design choice. As is noted from FIGS. 2 and 3, the connecting projection 110 is formed on the cover plate 22 and the receiving socket 112 is formed on the back plate 24.

The connecting projection 110 is preferably formed with three basic sections, those being a head portion 114, a shank portion 116 and a tip portion 118. As recognized by reviewing FIGS. 2 and 7, the head portion 114 is formed integrally, i.e. through molding, with the back surface 28 of the cover plate 22. The tip portion 118 is formed with a rounded end to facilitate entry of the connecting projection 110 into the receiving socket 112.

Toward the objective of providing infinite positioning within the connection range, a plurality of spaced resilient teeth 120 are formed on the shank portion 116. Although eight pairs of spaced teeth 120 are illustrated on the shank portion 116, the connecting projection may be formed with a lesser or greater number of pairs as desired. It will be obvious to those skilled in the art that if a relatively short connecting projection 110/receiving socket 112 combination is desired, it may be necessary to reduce the number of pairs of spaced teeth 120 in order to allow the proper axial spacing between longitudinally adjacent teeth.

As best seen in FIG. 8, each tooth 120 surrounds a part of the shank portion 116. With each of the teeth 120 in a spaced set being in the same plane, each spaced set forms in essence a pair of wings that are attached to the shank portion 116. This facilitates an even holding force when the teeth 120 are in their arresting configuration as will be described below.

The resilient nature of the teeth 120 is enhanced by the varying axial thickness thereof. More specifically, each tooth 120 has a top surface 122 and a bottom surface 124 relative to the axial direction of the connecting projection 110. Each tooth 120 includes an inclined surface 126 that slopes radially outwardly from the bottom surface 124 to the top surface 122 to establish a curvilinear edge 127 defining the extreme outer periphery of the connecting projection 110. It is of course recognized that the inclined surface 126 creates a region of gradually decreasing the thickness as the curvilinear edge 127 of the tooth 120 is approached. It is further recognized that each tooth 120 is more easily deformable in the region of the inclined surface 126 than closely adjacent to the shank portion 116 where the full thickness dimension of the tooth resides.

As seen from FIGS. 7 and 8, the spaced nature of the teeth 120 in each set creates opposing channels 128 between the teeth in the set that extends along the entire length of the shank portion 116. The channels 128 are defined by the side surfaces 130, 132 on opposing teeth 120, the side surfaces extending radially outwardly from the shank portion 116.

In a key aspect of the design of the connecting projection 110, the opposing surfaces 130, 132 diverge from each other as they extend radially outwardly from the shank portion 116. More particularly, each opposing side surface 130, 132 extends radially outwardly at an oblique angle relative to and away from a plane that bisects the channel 128. In the preferred embodiment, the oblique angle is substantially 10°. The provision of the angular divergence of the channel-defining side surfaces 130, 132 produces an advantage in ease of tooling for creating the projection 110.

As is shown in FIGS. 3 and 9, the receiving socket 112 is preferably formed integrally, i.e. through molding, with the back plate 24. The receiving socket 112 comprises a cylindrical body 134 with a through bore 136 extending from a proximal end 138 that receives the connecting projection 110 to the distal end 140 aligned with the back surface 28 of the back plate 24.

In the preferred design of the receiving socket 112, the through bore 136 is defined by four communicating sections. A guiding orifice 142 is formed at the proximal end 132 of the socket 112. The guiding orifice 142 has a frusto-conical configuration to assist in guiding receipt of the connecting projection 110 when presented for mating relationship in a working mode. The guiding orifice 142 is thus defined by a surface 144 that extends from an imaginary vertex $V_1$ at an oblique angle relative to the central axis of the receiving socket 112. Preferably, the surface 144 of the guiding orifice 142 extends from the imaginary vertex $V_1$ at substantially 45°.

At the narrow end of the frusto-conical surface 144, the guiding orifice 142 transitions into an arresting bore 146. The arresting bore 146 is formed with a cylindrical configuration for receiving and firmly engaging the periphery of the spaced teeth 120. The diameter of the arresting bore 146 is of slightly smaller dimension than the diameter defined by the outer curvilinear edge 127 of the teeth 120. Accordingly, the teeth 120 are necessarily deformed by virtue of their resiliency as they enter and are moved forwardly within the arresting bore 146.

The arresting bore 146 transitions through a locking shoulder 148 to a retaining bore 150 within the socket 112. The retaining bore 150 is also of cylindrical configuration and extends the greatest portion of the length of the receiving socket 112. The diameter of the retaining bore 150 is of greater dimension than the diameter of the arresting bore 146. The diameter of the retaining bore 150 is also of sufficient dimension to accept the presence of the teeth 120 without deformation. Thus, once the teeth 120 exit the arresting bore 146, they are allowed to recover to their normal configuration due to the resilient nature thereof. The close fit between the teeth 120 and the retaining bore 150, in combination with the interference fit between the teeth and the arresting bore 146, provides an alignment and stabilizing function that squares the cover plate 22 to the back plate 24.

The locking shoulder 148 provides added locking security of the connecting projection 110 within the receiving socket 112. More specifically, the locking shoulder 148 extends only a short axial distance within the socket 112 and quickly angles from the arresting bore 146 to the retaining bore 150. Once the teeth 120 on the connecting projection 110 pass into the retaining bore 150 from the arresting bore 146 and regain their undeformed configuration, the direction of incline of the surface 126 of the teeth 120 prevents reverse deformation thereof. Thus, the teeth 120 within the retaining bore 150 are secured against withdrawal therefrom.

The locking shoulder 148 is also formed with a frusto-conical configuration to allow the teeth 120 to slide progressively from their compressed state within the arresting bore 146 to their relaxed state within the retaining bore 150. The locking shoulder 148 thus has a surface 152 that extends from an imaginary vertex $V_2$ at an oblique angle relative to the central axis of the receiving socket 112. For optimum strength of material, the frusto-conical surface 152 of the locking shoulder is preferably constructed at an angle of substantially 60° in relation to the central axis.

Figure 10:
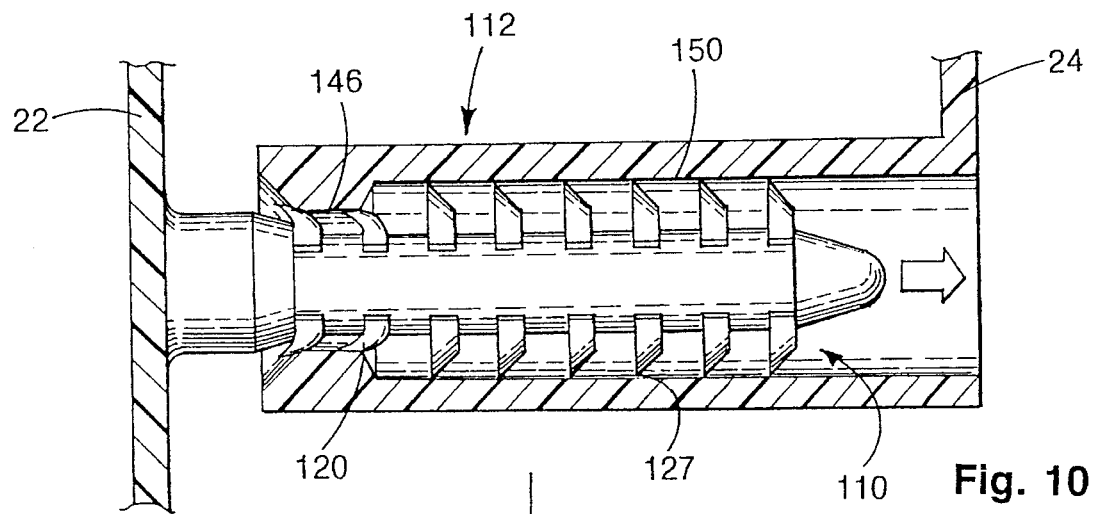
FIG. 10 is a cross-sectional view of the connecting projection in operative position within the receiving socket.

The connecting operation of the connection projection 110 and receiving socket 112 is best shown in FIG. 10. As the cover plate 22 and back plate 24 are brought together for assembly into a working mode, the tip portion 118 of the connecting projection 110 enters the guiding orifice 142. As the projection 110 travels forwardly into the receiving socket 112, the sets of spaced teeth 120 are sequentially introduced into the arresting bore 146. By virtue of the reduced thickness of the teeth 120 near their curvilinear edge 127, and their resulting resiliency, and the direction of the inclined surface 126 allowing the teeth to bend backwards during forward travel, the teeth are deformed and compressed (note the last two sets of teeth shown in the arresting bore 146). The forces exerted by the compressed teeth 120 against the surface of the arresting bore 146, in addition to the specific inclination of the teeth, holds the projection 110 against relative movement within the socket 112. Thus, it can be appreciated that the projection 110 is gradually inserted through forward travel into the receiving socket 112, to be held in whatever of the infinite relative positions desired.

It is further appreciated that the connecting projection 110 resists backward or withdrawal movement within the receiving bore 112 due to the design configuration of the teeth 120. More specifically, the withdrawing force required for the connecting projection 110 is significant in view of the backward bending of the teeth 120 during deformation and compression as they are inserted into the arresting bore 146. Furthermore, the locking shoulder 148 provides additional security to prevent the connecting projection 110 from being withdrawn from the receiving socket 112. More specifically, after the teeth 120 regain the normal configuration upon entry into the retaining bore 150, they completely resist reverse deformation if, upon attempt at withdrawal, the bottom surface 124 of the teeth 120 engages the surface 152 of the locking shoulder 148. Thus, even if the significant forces between the compressed teeth 120 and the arresting bore 146 are overcome upon withdrawal movement, the locking shoulder 148 acts as a back-up to prevent the connecting projection 110 from being withdrawn from the receiving socket 112.

An additional important feature of the inventive bracket 10 relates to the design of the components to allow easy and space efficient transport. More specifically, the placement of the connecting projection 110 and receiving socket 112 on the cover plate 22 and back plate 24, respectively, not only allows functional connection of the cover plate and back plate in a working mode, but also allows a nesting configuration for transport.

Figure 11:
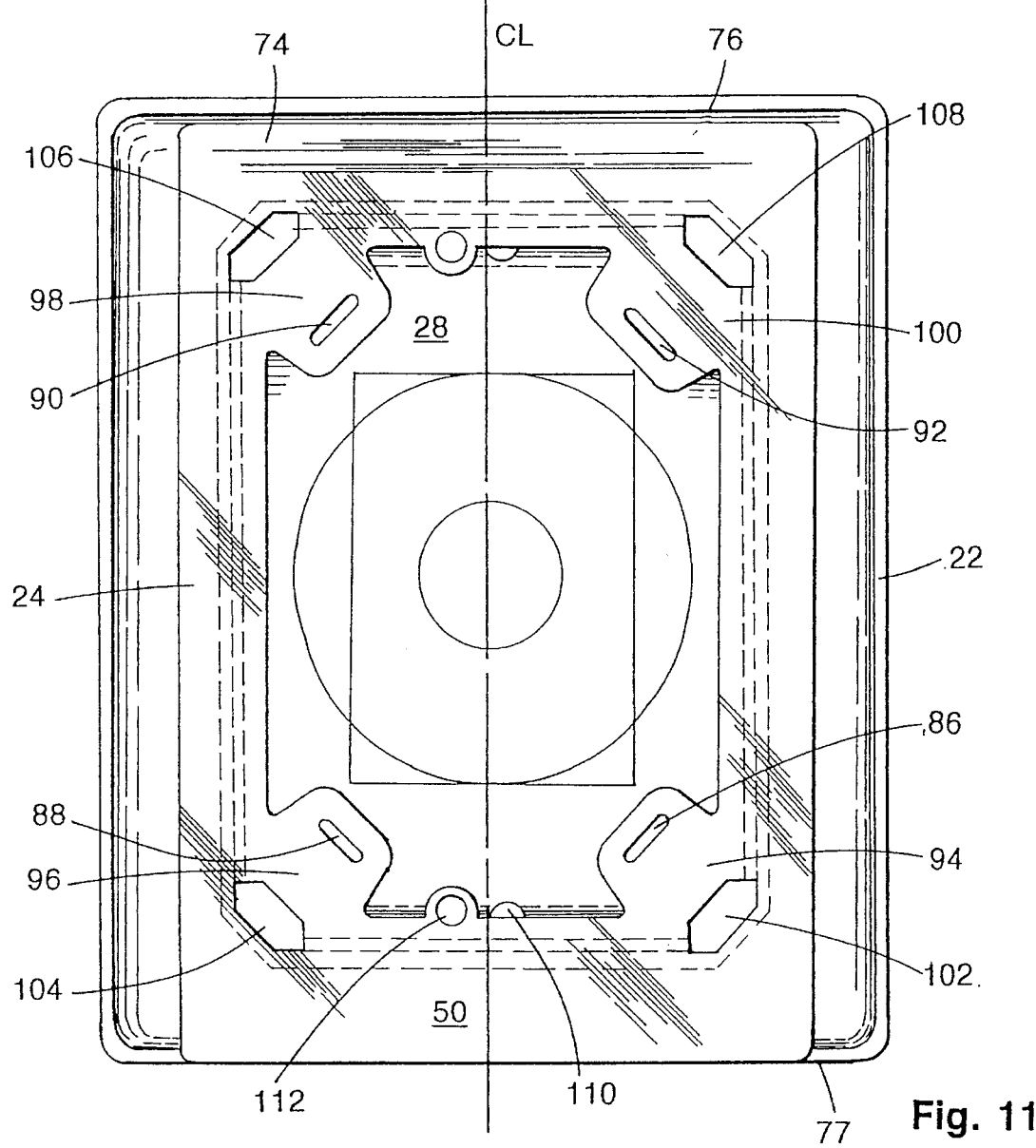
FIG. 11 is a rear view of the mounting bracket shown in the transport mode.

The versatility of function in the preferred embodiment is allowed by designing the connecting projection 110 and receiving socket 112 for placement in a laterally offset position relative to a center line bisecting their respective supporting component. Accordingly, with reference to the preferred embodiment as illustrated in FIGS. 5 and 6, the receiving socket 112 is set in closer proximity to the sloped section 66 along the top flat 56 of the neck extension 54. Likewise, the connecting projection 110 is positioned in closer proximity to the slanted section 42 along the top wall 32 of the sleeve extension 30. It can visualized that as the back plate 24 in FIG. 5 is folded over to be put in facing presentation to the cover plate 22 in FIG. 6 for assembly in a working mode, the connecting projection 110 and receiving socket 112 are aligned with each other for mating engagement. Furthermore, as the back plate 24 is rotated about a central axis perpendicular to the page illustrating the drawing figures, so as to place the deflecting strip 74 in proximity to the top edge of the cover plate as shown in FIG. 11, the connecting projection 110 and the receiving socket 112 are laterally offset from each other. Accordingly, the cover plate 22 and back plate 24 are allowed to be brought together in unconnected but nesting relationship in a transport mode.

To further enhance the transport configuration, recesses are formed on the back surface 28 of the cover plate 22 and the second surface 52 of the back plate 24 to receive the socket 112 and projection 110, respectively, in nesting relationship for transport. The use of recesses 154 and 156 facilitate closer nesting relationship between the cover plate 22 and the back plate 24 and measurably reduces the cost of material in forming the inventive bracket 10.

In summary, numerous benefits result from employing the concepts of the present invention. The deflecting strip 74 depending from the back plate 24, and obliquely angled away from the wall 14 to which the bracket 10 is attached, advantageously directs water cascading along the back plate 24 away from the interior of the wall of the building structure to drain to the siding-covered exterior. This results in protection against the introduction of fluids such as rainwater to the cut made in the siding 16 for placement of the bracket 10 against the wall 14.

The bracket 10 is provided with axial interengaging means to allow the cover plate 22 and back plate 24 thereof to be placed in any one of an infinite number of positions, within the connection range, relative to each other. This feature provides further versatility in allowing the bracket 10 to be used with any variety and size dimension of siding 16. The bracket 10 is also provided with alternative areas for receiving attachment members so that the installer has an option of using any one of a number of such attachment members to secure the bracket 10 to the wall 14 of the building structure. The placement of the attachment spots substantially coplanar with, or interior of, the enclosing frame defined by the telescoping sleeve and neck extensions 30 and 54, respectively, helps to protect the attachment elements from exposure to environmental factors.

Finally, the connecting projection 110 and receiving socket 112 are so positioned on their respective support components as to be directly aligned for assembly in a working mode while also allowing them to be laterally offset from one another when one of the components is rotated about a central axis. This permits the cover plate 22 and back plate 24 to be nested together in an unconnected manner for ease and space efficiency for transport.

The foregoing description of a preferred embodiment of the invention has been presented for purposes of illustration and description. It is not intended to be exhaustive or to limit the invention to the precise form disclosed. Obvious modifications or variations are possible in light of the above teachings. The embodiment was chosen and described to provide the best illustration of the principles of the invention and its practical application to thereby enable one of ordinary skill in the art to utilize the invention in various embodiments and with various modifications as is suited to the particular use contemplated. All such modifications and variations are within the scope of the invention as determined by the appended claims when interpreted in accordance with breadth to which they are fairly, legally and equitably entitled.

We claim:

1. A bracket for mounting a fixture on a building structure with a stepped siding overlay, comprising:
   a cover plate for supporting said fixture;
   a back plate for attachment to said building structure; and
   a strip depending at an oblique angle from, and with respect to, said back plate for deflecting fluid away from said building structure,
   whereby fluid is substantially prevented from being introduced within said building structure in the attachment area of said bracket.

2. The bracket as in claim 1, wherein said strip is formed integrally with said back plate.

3. The bracket as in claim 1, wherein said oblique angle is substantially 45°.

4. The bracket as in claim 1, wherein said back plate has a flange at each of side edges thereof to contain fluid flowing therealong within the lateral boundaries of said back plate.

5. The bracket as in claim 4, wherein said strip has a flange at each of side edges thereof to contain fluid flowing therealong within the lateral boundaries of said strip.

6. The bracket as in claim 5, wherein said flanges of said back plate and said flanges of said strip are in substantial linear alignment.

7. The bracket as in claim 1, wherein said cover plate and said back plate are formed as separate and discrete components of said bracket.

8. The bracket as in claim 7, further including means to facilitate infinite positioning of said cover plate relative to said back plate.

9. The bracket as in claim 8, wherein said infinite positioning means comprises axial interengaging means.

10. The bracket as in claim 9, wherein said axial interengaging means comprises a connecting projection cooperating with a receiving socket.

11. The bracket as in claim 10, wherein said connecting projection is formed integrally with one of said cover plate and said back plate and said receiving socket is formed integrally with the other of said cover plate and said back plate.

12. The bracket as in claim 10, wherein said connecting projection includes a plurality of sets of spaced resilient teeth disposed on a longitudinal shank.

13. The bracket as in claim 12, wherein said sets of spaced resilient teeth define channels along opposing sides of said longitudinal shank.

14. The bracket as in claim 13, wherein at least one of opposing side surfaces of said set of teeth defining each of said channels extends radially from said shank at an oblique angle relative to a plane bisecting said channels.

15. The bracket as in claim 14, where said oblique angle is substantially 10°.

16. The bracket as in claim 10, wherein said receiving socket comprises a proximal end, a distal end and a plurality of discrete bores.

17. The bracket as in claim 16, wherein said proximal end is defined by a guiding orifice.

18. The bracket as in claim 17, wherein said guiding orifice has a frusto-conical configuration.

19. The bracket as in claim 18, wherein said guiding orifice is defined by a surface that extends from an imaginary vertex at an angle of substantially 45° relative to the central axis of said receiving socket.

20. The bracket as in claim 16, wherein is provided an arresting bore that communicates with said proximal end.

21. The bracket as in claim 20, wherein said arresting bore has a cylindrical configuration.

22. The bracket as in claim 21, wherein said distal end is defined by a retaining bore that communicates with said arresting bore.

23. The bracket as in claim 22, wherein said retaining bore has a cylindrical configuration, with a diameter of dimension greater than the diameter of said arresting bore.

24. The bracket as in claim 22, further including a locking shoulder transitioning between said arresting bore and said retaining bore.

25. The bracket as in claim 24, wherein said locking shoulder has a frusto-conical configuration.

26. The bracket as in claim 25, wherein said locking shoulder is defined by a surface that extends from an imaginary vertex at an angle of substantially 60° relative to the central axis of said socket.

27. The bracket as in claim 1, wherein said back plate comprises at least two attachment apertures, the through dimension of a first attachment aperture being greater than the through dimension of a second attachment aperture.

28. The bracket as in claim 27, wherein said first attachment aperture having a greater through dimension comprises a passage through a neck extension formed on said back plate.

29. The bracket as in claim 28, wherein is provided a plurality of sets of at least two attachment apertures, said sets being symmetrically positioned on said back plate.

30. The bracket as in claim 29, wherein one of said sets of attachment apertures is positioned in each of four corner positions on said back plate.

31. The bracket as in claim 1, further including a cavity defined by an enclosing frame bridging said cover plate and said back plate.

32. The bracket as in claim 31, wherein said back plate comprises at least one attachment aperture in a substantially coplanar position with respect to said enclosing frame.

33. The bracket as in claim 32, wherein said back plate comprises at least one attachment aperture interior of said enclosing frame.

34. The bracket as in claim 33, wherein said back plate comprises at least two attachment apertures, a first attachment aperture in a substantially coplanar position with said enclosing frame, and a second attachment aperture interior of said enclosing frame.

35. The bracket as in claim 7, wherein said cover plate and said back plate are configured so as to present themselves to each other in connecting relationship in a working mode and to present themselves to each other in nesting relationship in a transport mode.

36. The bracket as in claim 35, wherein a connecting projection is formed on one of said cover plate and said back plate and a receiving socket is formed on the other of said cover plate and said back plate, said connecting projection and said receiving socket being positioned so as to be in alignment for mating in said working mode and so as to be unaligned for nesting in said transport mode.

37. The bracket as in claim 36, wherein each of said connecting projection and said receiving socket is laterally offset from a center line bisecting the one of said cover plate or said back plate on which it is formed.

38. The bracket as in claim 37, wherein the one of said cover plate and said back plate supporting said connecting projection further includes a recess on an inner surface thereof for receiving said receiving socket for nesting when in said transport mode.

39. The bracket as in claim 38, wherein the one of said cover plate and said back plate supporting receiving socket further includes a recess on an inner surface thereof for receiving said connecting projection for nesting when in said transport mode.

40. In combination with a building structure, a bracket for mounting a fixture on said building structure, comprising:

a cover plate for supporting said fixture;

a back plate for attachment to said building structure; and a strip depending from said back plate and spaced from said building structure for deflecting fluid away from said building structure, whereby fluid is substantially prevented from being introduced within said building structure in the attachment area of said bracket.

\* \* \* \* \*